United States Patent
Park

(10) Patent No.: US 10,753,496 B2
(45) Date of Patent: Aug. 25, 2020

(54) VALVE AND VALVE COUPLING WITH REVERSE TAPERED SHAFTS

(71) Applicant: Victaulic Company, Easton, PA (US)

(72) Inventor: Yang Bae Park, Easton, PA (US)

(73) Assignee: Victaulic Company, Easton, PA (US)

( * ) Notice: Subject to any disclaimer, the term of this patent is extended or adjusted under 35 U.S.C. 154(b) by 333 days.

(21) Appl. No.: 15/355,562

(22) Filed: Nov. 18, 2016

(65) Prior Publication Data

US 2017/0146145 A1 May 25, 2017

Related U.S. Application Data

(60) Provisional application No. 62/258,797, filed on Nov. 23, 2015.

(51) Int. Cl.
| | |
|---|---|
| *F16K 1/22* | (2006.01) |
| *F16K 27/00* | (2006.01) |
| *F16K 1/20* | (2006.01) |
| *B23P 19/00* | (2006.01) |
| *F16L 21/03* | (2006.01) |
| *F16L 29/00* | (2006.01) |
| *F16K 1/226* | (2006.01) |

(Continued)

(52) U.S. Cl.
CPC ............... *F16K 27/00* (2013.01); *B23P 19/00* (2013.01); *F16K 1/2028* (2013.01); *F16K 1/2057* (2013.01); *F16K 1/22* (2013.01); *F16K 1/224* (2013.01); *F16K 1/2263* (2013.01); *F16K 27/0218* (2013.01); *F16L 19/0206* (2013.01); *F16L 21/03* (2013.01); *F16L 29/00* (2013.01); *F16L 29/007* (2013.01)

(58) Field of Classification Search
CPC . F16K 27/00; F16K 1/22; F16K 1/224; F16K 1/2263; F16K 27/0218; F16L 19/0206; F16L 21/03; F16L 23/08; F16L 29/00; F16L 29/007
USPC .................................................. 251/305, 308
See application file for complete search history.

(56) References Cited

U.S. PATENT DOCUMENTS

| | | | |
|---|---|---|---|
| 3,081,791 A | 3/1963 | Wheatley | |
| 3,260,496 A | 7/1966 | Borcherdt | |

(Continued)

FOREIGN PATENT DOCUMENTS

| | | |
|---|---|---|
| GB | 2033054 A | 5/1980 |
| GB | 2193296 A | 2/1988 |
| JP | 5-10457 | 1/1993 |

OTHER PUBLICATIONS

Copenheaver, Blaine R.; International Search Report from counterpart International patent application No. PCT/US2016/062487, dated Jan. 31, 2017, pp. 1-2, United States Patent and Trademark Office as Searching Authority; Alexandria, Virginia USA.

(Continued)

*Primary Examiner* — Kevin F Murphy
*Assistant Examiner* — Kelsey E Cary
(74) *Attorney, Agent, or Firm* — Ballard Spahr LLP

(57) ABSTRACT

A valve or a valve coupling has a closing member rotatably mounted within the bore of a housing. The valve closing member is mounted on tapered shafts. The shafts may be stepwise tapered, or a portion of the shafts may be tapered. The ends of the shafts having the larger diameters engage lugs on the valve closing member and the ends having the smaller diameters extend from the housing.

32 Claims, 12 Drawing Sheets

(51) Int. Cl.
*F16K 27/02* (2006.01)
*F16L 19/02* (2006.01)

(56) References Cited

U.S. PATENT DOCUMENTS

| | | |
|---|---|---|
| 3,528,448 A | 9/1970 | Urban |
| 3,661,171 A | 5/1972 | Smith et al. |
| 3,778,028 A | 12/1973 | Graves et al. |
| 3,997,142 A | 12/1976 | Broadway |
| 4,258,901 A | 3/1981 | Zinnai et al. |
| 4,272,054 A | 6/1981 | Zinnai |
| 4,373,543 A | 2/1983 | Brown et al. |
| 4,487,216 A | 12/1984 | Barker et al. |
| 4,491,298 A | 1/1985 | Beauchamp et al. |
| 5,018,548 A | 5/1991 | McLennan |
| 5,018,704 A | 5/1991 | McLennan |
| 5,685,520 A | 11/1997 | Velan |
| 2002/0134960 A1 | 9/2002 | Zwick |
| 2004/0238568 A1 | 12/2004 | Brimson |
| 2006/0000997 A1* | 1/2006 | Shimada ............... F02D 9/107 251/308 |
| 2011/0260086 A1 | 10/2011 | Arnold et al. |
| 2016/0348800 A1 | 12/2016 | Abouelleil et al. |

OTHER PUBLICATIONS

Copenheaver, Blaine R.; Written Opinion from counterpart International patent application No. PCT/US2016/062487, dated Jan. 31, 2017, pp. 1-9, United States Patent and Trademark Office as Searching Authority; Alexandria, Virginia USA.

\* cited by examiner

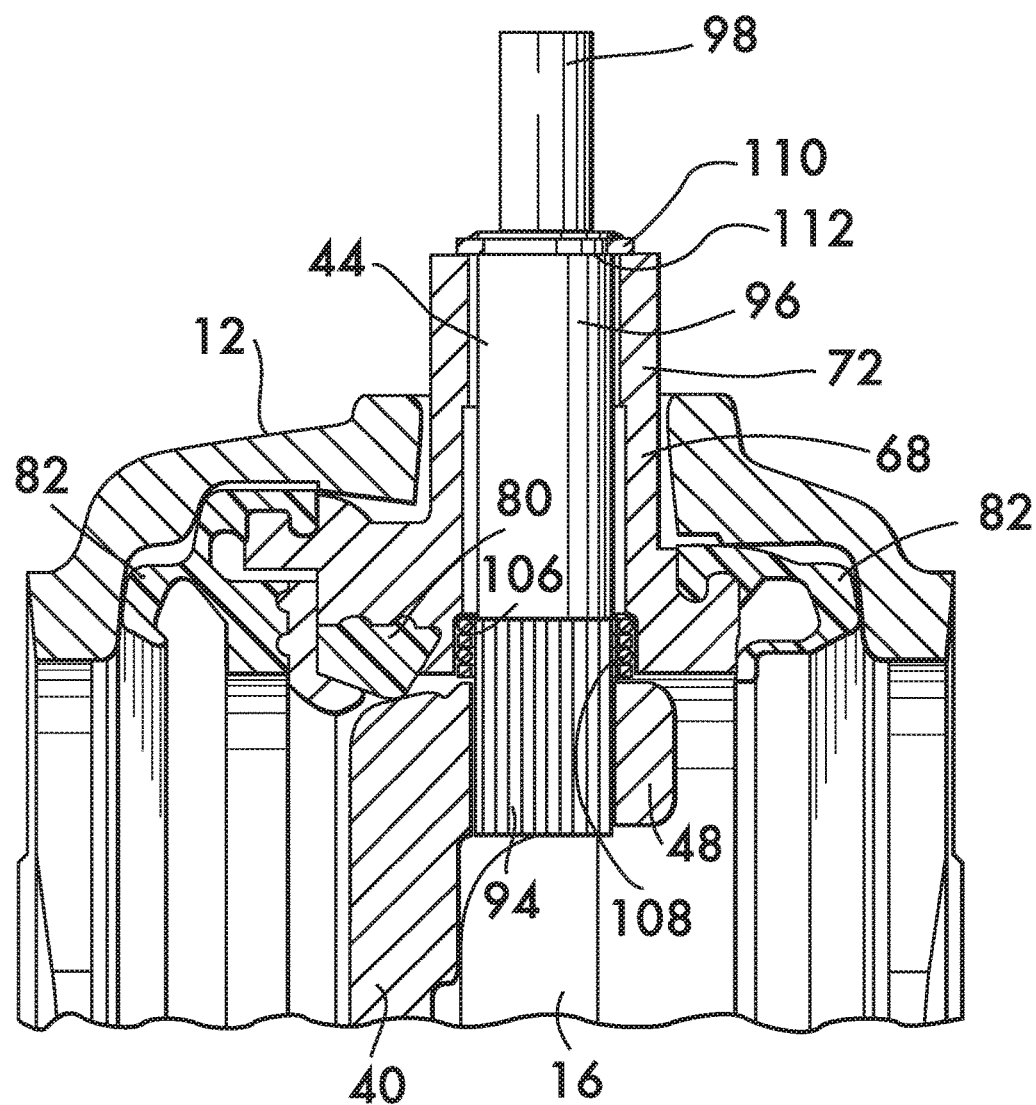
FIG. IIA

VALVE AND VALVE COUPLING WITH REVERSE TAPERED SHAFTS

CROSS REFERENCE TO RELATED APPLICATION

This application is based upon and claims priority to U.S. Provisional Application No. 62/258,797, filed Nov. 23, 2015 and hereby incorporated by reference.

FIELD OF THE INVENTION

This invention relates to fluid control devices that are combinations of valves and mechanical couplings.

BACKGROUND

Valves, in particular, butterfly valves having a disk rotatably mounted within a bore of a valve housing present numerous challenges in both their design and assembly. Valves according to the prior art are designed to be assembled from the outside of their housing. The disk is positioned within the bore and valve stems or shafts are inserted from outside of the housing into the bore to rotatably mount the disk within the housing. Such a design requires complicated seals and bonnets which must retain the shafts against the internal pressure of the valve. Advantage may be had by an improved valve design which does not suffer the disadvantages of valve according to the prior art.

SUMMARY

The invention concerns a valve for controlling flow through pipe elements. In one example embodiment the valve comprises a valve housing surrounding and defining a bore. A valve closing member is mounted within the bore. The valve closing member is rotatable about an axis of rotation between an open position permitting flow through the bore and a closed position preventing flow through the bore. First and second lugs are mounted in spaced relation to one another on the valve closing member. The lugs define respective apertures aligned with the axis of rotation. First and second shafts extend in opposite directions along the axis of rotation. The first shaft is received within the aperture of the first lug, the second shaft is received within the aperture of the second lug. First and second bearings are mounted on the valve housing diametrically opposite to one another. The first and second bearings respectively define first and second passages through the valve housing. The first and second passages are aligned with the axis of rotation. The first bearing receives the first shaft, the second bearing receives the second shaft. Each shaft has a diameter at a first end larger than a diameter at a second end. The first end of the first shaft engages the first lug, the first end of the second shaft engages the second lug.

In one example embodiment the first bearing comprises a first bonnet extending from the valve housing. Further by way of example, the second bearing comprises a second bonnet extending from the valve housing.

In an example embodiment, at least a portion of one of the shafts is tapered. In a specific example, at least one of the shafts is step-wise tapered from the first end to the second end. An example valve further comprises a first seal positioned between the first bearing and the first shaft. Further by way of example, a second seal is positioned between the second bearing and the second shaft.

In an example embodiment a first end of at least one of the shafts comprises a male spline. In an example, at least one of the lugs comprises a female spline. The male spline engages the female spline to secure the at least one shaft to the at least one lug. In a particular example embodiment the first end of the at least one shaft is tapered.

In an example embodiment a valve further comprises a plurality of segments attached to one another end to end surrounding the housing and forming a coupling for joining the pipe elements. Each in this example segment has attachment members located at opposite ends. Each segment has arcuate surfaces positioned on opposite sides thereof for engagement with the pipe elements.

In an example embodiment the attachment members comprise attachment lugs extending outwardly from opposite ends of each segment. Each attachment lug defines a hole for receiving a fastener. By way of example, the arcuate surfaces project from the segments radially toward an axis aligned coaxially with the bore.

In a specific example embodiment the plurality of segments comprises no more than two segments. By way of further example, at least one of the bonnets extends through an opening in one of the segments. In a specific example embodiment the valve closing member comprises a disk.

The invention further encompasses a valve coupling for joining pipe elements and controlling flow therethrough. In an example embodiment the valve coupling comprises a plurality of segments attached to one another end to end surrounding a central space. A valve housing is captured between the segments and surrounds and defines a bore. A valve closing member is mounted within the bore. The valve closing member is rotatable about an axis of rotation between an open position permitting flow through the bore and a closed position preventing flow through the bore. First and second lugs are mounted in spaced relation to one another on the valve closing member. The lugs define apertures aligned with the axis of rotation. First and second shafts extend in opposite directions along the axis of rotation. The first shaft is received within the aperture of the first lug, the second shaft is received within the aperture of the second lug. First and second bearings are mounted on the valve housing diametrically opposite to one another. The first and second bearings respectively define first and second passages through the valve housing. The first and second passages are aligned with the axis of rotation. The first bearing receives the first shaft, the second bearing receives the second shaft. Each shaft has a diameter at a first end larger than a diameter at a second end. The first end of the first shaft engages the first lug, the first end of the second shaft engages the second lug.

In one example embodiment the first bearing comprises a first bonnet extending from the valve housing. By way of further example, the second bearing comprises a second bonnet extending from the valve housing. In an example embodiment, at least one of the bonnets extends through an opening in one of the segments. In an example embodiment, at least a portion of at least one of the shafts is tapered. Further by way of example, at least one of the shafts is step-wise tapered from the first end to the second end.

In an example embodiment, a first seal is positioned between the first bearing and the first shaft. Further by way of example, a second seal is positioned between the second bearing and the second shaft. In a specific example embodiment, a first end of at least one of the shafts comprises a male spline. Further by way of example, at least one of the lugs comprises a female spline. The male spline engages the female spline to secure the at least one shaft to the at least one lug. In a particular example embodiment, the first end of the at least one shaft is tapered.

An example valve coupling further comprises attachment members located at opposite ends of each the segment. Arcuate surfaces are positioned on opposite sides of each the segment for engagement with the pipe elements. By way of example, the attachment members comprise attachment lugs extending outwardly from opposite ends of each segment. Each attachment lug defines a hole for receiving a fastener.

In one example embodiment, the arcuate surfaces project from the segments radially toward an axis aligned coaxially with the bore. In a specific example, the plurality of segments comprises no more than two the segments. In a particular example embodiment the valve closing member comprises a disk.

The invention also encompasses a method of assembling a valve having a housing defining a bore in which a valve closing member is rotatably mounted on first and second shafts. In one example embodiment the method comprises:
  positioning the valve closing member within the bore so as to align first and second lugs mounted on the valve closing member with respective first and second bearings in the housing;
  positioning the first shaft between the lugs;
  inserting the first shaft through the first lug and into the first bearing;
  positioning the second shaft between the lugs;
  inserting the second shaft though the second lug and into the second bearing.

An example embodiment further comprises:
  positioning the housing within a first segment of a coupling;
  attaching a second segment to the first segment so as to surround the housing.

BRIEF DESCRIPTION OF THE DRAWINGS

FIG. 11A is a longitudinal sectional view of a portion of the valve coupling on an enlarged scale.

DETAILED DESCRIPTION

Figure 1:
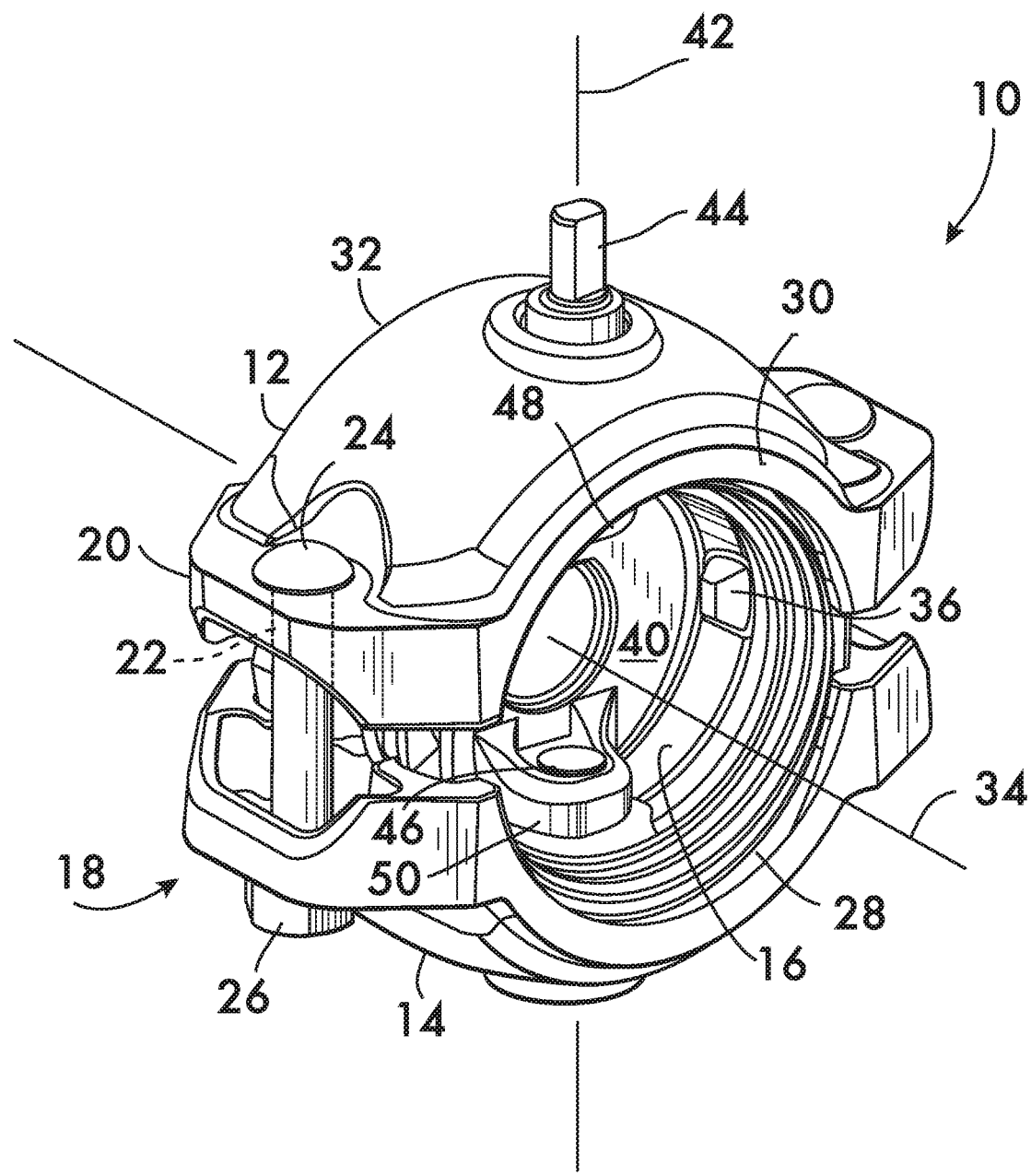
FIG. 1 is an isometric view of an example embodiment of a valve coupling according to the invention shown in a pre-assembled state.

FIG. 1 shows an example embodiment of a combination valve and mechanical coupling 10, hereafter referred to as a valve coupling. Valve coupling 10 comprises a plurality of segments, in this example, two segments 12 and 14 attached to one another end to end to surround and define a central space 16. Attachment of segments 12 and 14 is effected by adjustable attachment members 18 located at each end of each segment. In this example the attachment members comprise attachment lugs 20 which extend outwardly from the segments 12 and 14, the lugs having holes 22 that receive adjustable fasteners, such as bolts 24 and nuts 26. Tightening of the nuts 26 draws the segments 12 and 14 toward one another as described below.

Segments 12 and 14 each have arcuate surfaces 28 positioned on opposite sides 30 and 32 of segments 12 and 14. Arcuate surfaces 28 face a longitudinal axis 34 that passes through the central space 16 and are engageable with pipe elements when the pipe elements are inserted between the segments 12 and 14 and into central space 16 as described below. The arcuate surfaces 28 may project toward axis 34 to thereby engage circumferential grooves in the pipe elements upon tightening of the attachment members 18 and provide mechanical engagement to secure the pipe elements in end to end relation to form a joint. The arcuate surfaces 28 may also engage pipe elements having plain end, or ends having a shoulder and/or a bead as are known in the art.

Figure 2:
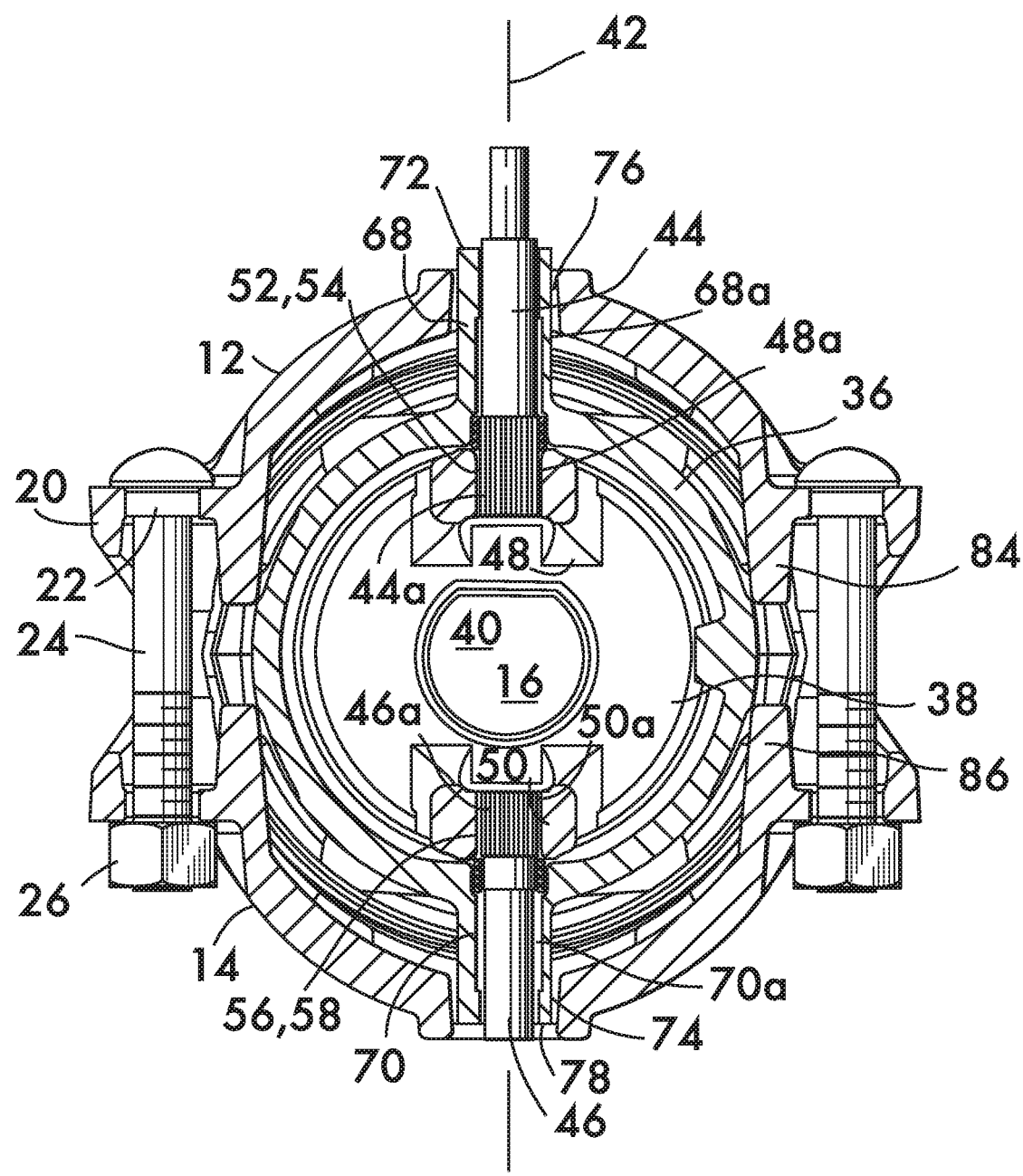
FIG. 2 is a cross sectional view of the valve coupling shown in FIG. 1.
Figure 2A:
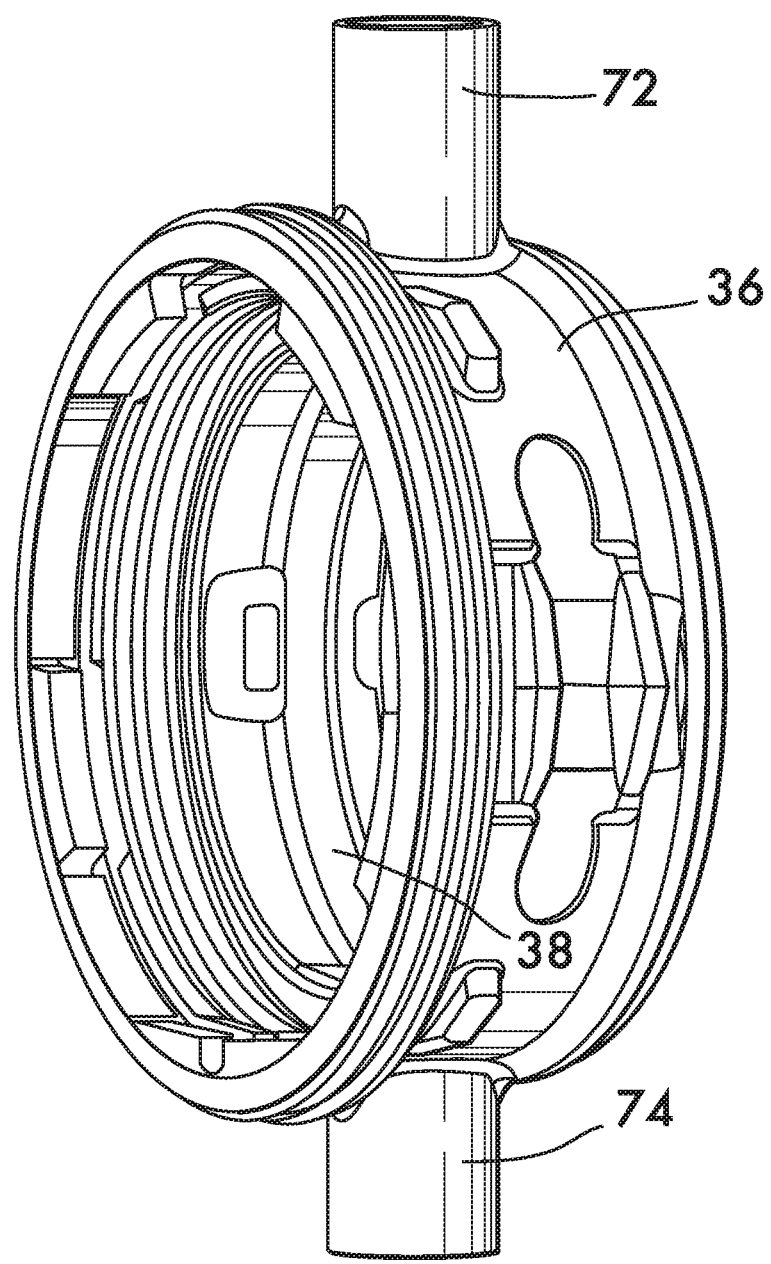
FIG. 2A is an isometric view of a component of the valve coupling shown in FIG. 1.
Figure 8:
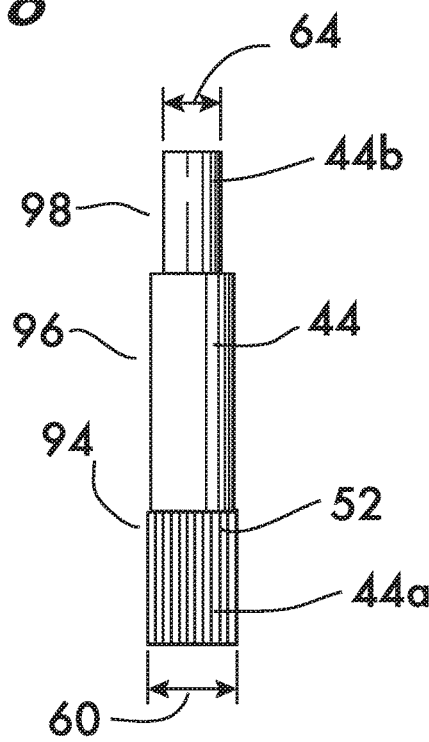
FIGS. 8 and 9 are longitudinal sectional views of components of the valve coupling.
Figure 9:
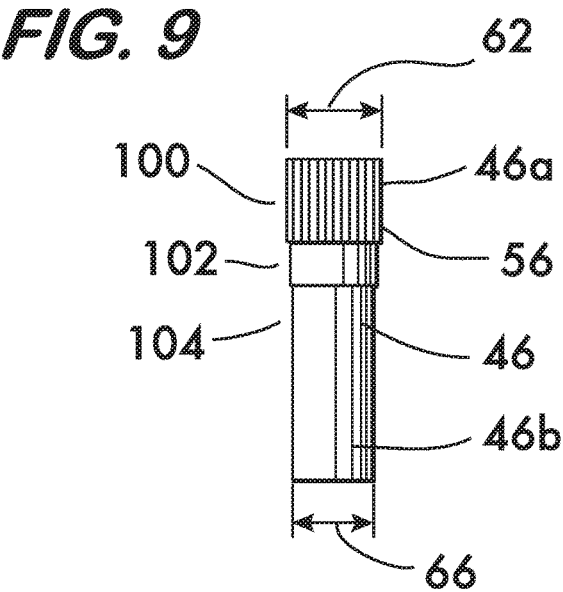

FIGS. 1, 2 and 2A show a valve housing 36 that is positioned within central space 16 and captured between segments 12 and 14. Valve housing 36 surrounds and defines a bore 38 in which a valve closing member 40, in this example a disk, is mounted. Other example valve closing members usable with this invention include ball closing members and plug closing members. Valve closing member 40 is rotatable about an axis of rotation 42 between an open position, permitting flow through bore 38, and a closed position (shown) preventing flow. Valve closing member 40 is mounted on first and second shafts 44 and 46 which extend in opposite directions from one another along axis 42. Mounting of the valve closing member 40 on shafts 44 and 46 is effected by first and second lugs 48 and 50 mounted on valve closing member 40 in spaced relation to one another. Lugs 48 and 50 define respective apertures 48a and 50a which are aligned with axis 42 and receive shafts 44 and 46 respectively. Mechanical engagement between shafts 44 and 46 and their respective lugs 48 and 50 is advantageously enhanced using male and female splines. As shown in FIGS. 2, 8 and 9, a first end 44a of shaft 44 comprises a male spline 52 which engages a female spline 54 defined by lug 48. Similarly, a first end 46a of shaft 46 defines a male spline 56 which engages a female spline 58 defined by lug 50. Engagement between the shafts 44 and 46 and their respective lugs 48 and 50 may also be effected by other means, such as an interference fit between lug and shaft, as well as keys.

As further shown in FIGS. 8 and 9, the first ends 44a and 46a of each shaft 44 and 46 have respective diameters 60 and 62 which are larger than the respective shaft diameters 64, 66 at second, opposite ends 44b, 46b of the shafts. To effect this geometric configuration the shafts 44 and 46 may be continuously tapered or step-wise tapered from the first end to the second end. The tapered shaft geometry permits the valve component of the valve coupling 10 to be assembled as described below, with the first ends 44a, 46a of shafts 44 and 46 respectively engaging the first and second lugs 48 and 50 of valve closing member 40.

As shown in FIG. 2, valve housing 36 comprises first and second bearings 68 and 70. Bearings 68 and 70 are positioned diametrically opposite to one another, are aligned with axis 42, and define first and second passages 68a and 70a through the housing 36. First and second shafts 44 and 46 are received within and supported by respective first and second bearings 68 and 70. In this example embodiment the bearings 68 and 70 comprise respective first and second bonnets 72 and 74 (see FIG. 2A) that extend from the housing 36. The bonnets 72 and 74 in turn extend through respective openings 76 and 78 in segments 12 and 14. Engagement between bonnets 72 and 74 and the segments 12 and 14 helps to stabilize the valve housing 36 within the central space 16.

Figure 3:
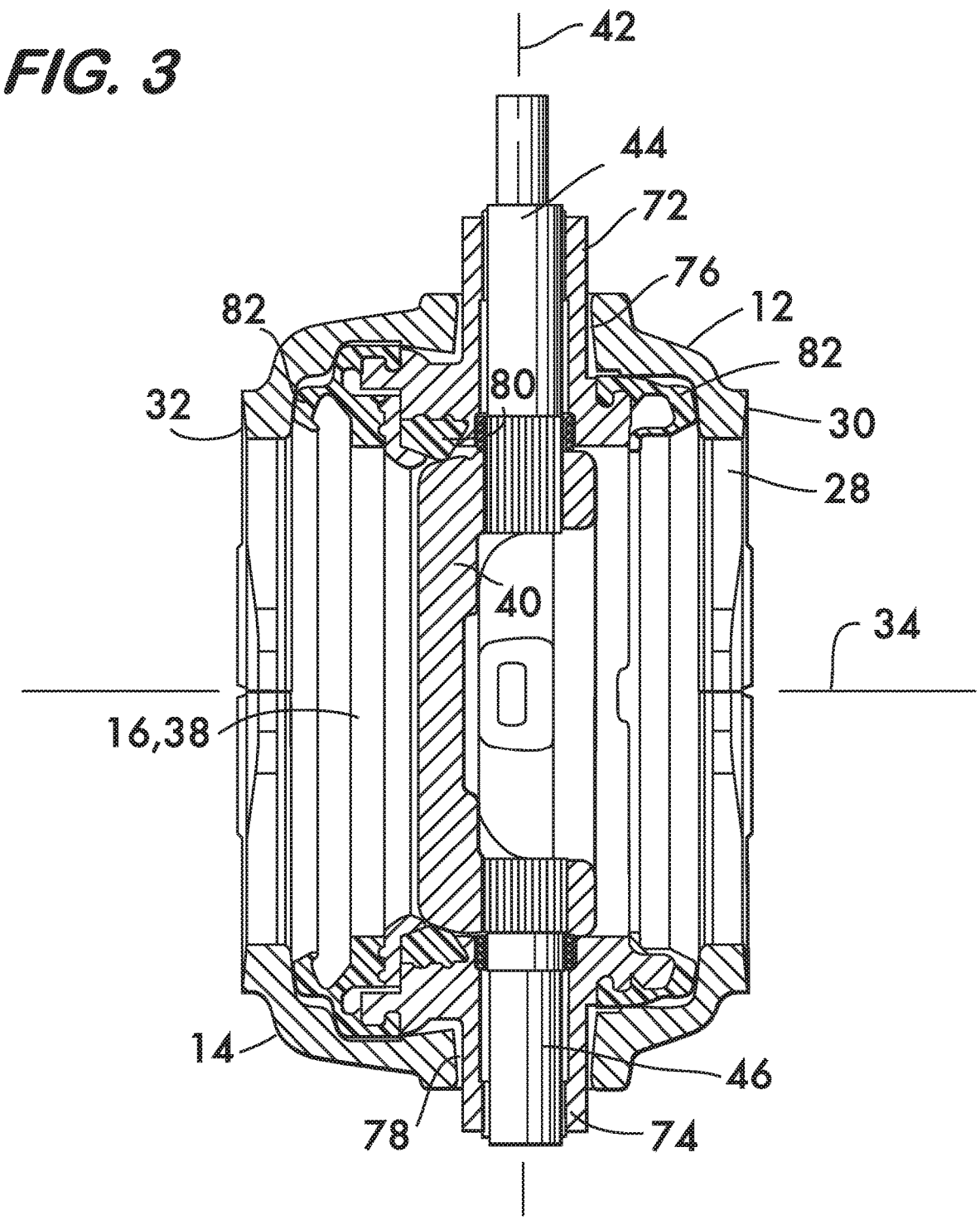
FIG. 3 is a longitudinal sectional view of the valve coupling shown in FIG. 1 in the state as used to form a pipe joint.

As shown in FIG. 3, bore 38 further houses a seal 80. Seal 80 comprises a ring that surrounds the central space 16 and sealingly engages the valve closing member 40 when it is in the closed position. Additional seals 82, are positioned between the segments 12 and 14 and the valve housing 36. Seals 82 establish a seal between the segments 12 and 14, the valve housing 36 and pipe elements when a joint is created by tightening the attachment members 18 to draw the segments toward one another and engage the pipe elements to create a joint.

It is advantageous to support segments 12 and 14 in spaced apart relation (as shown in FIG. 1) sufficient to permit insertion of pipe elements into the central space 16 without the need to first disassemble the valve coupling 10. FIG. 1 shows the valve coupling 10 in the so-called "pre-assembled state", as it would be supplied to the end user, with the segments 12 and 14 connected in end to end relation by the attachment members 18 (lugs 20, bolts 24 and nuts 26) yet supported in spaced relation to permit pipe element insertion. This configuration allows for efficient formation of a joint, as all that is required is for the pipe elements to be inserted into the central space 16 (in engagement with seals 82) and the nuts 26 tightened to draw segments 12 and 14 toward one another and into engagement with the pipe elements.

Figure 4:
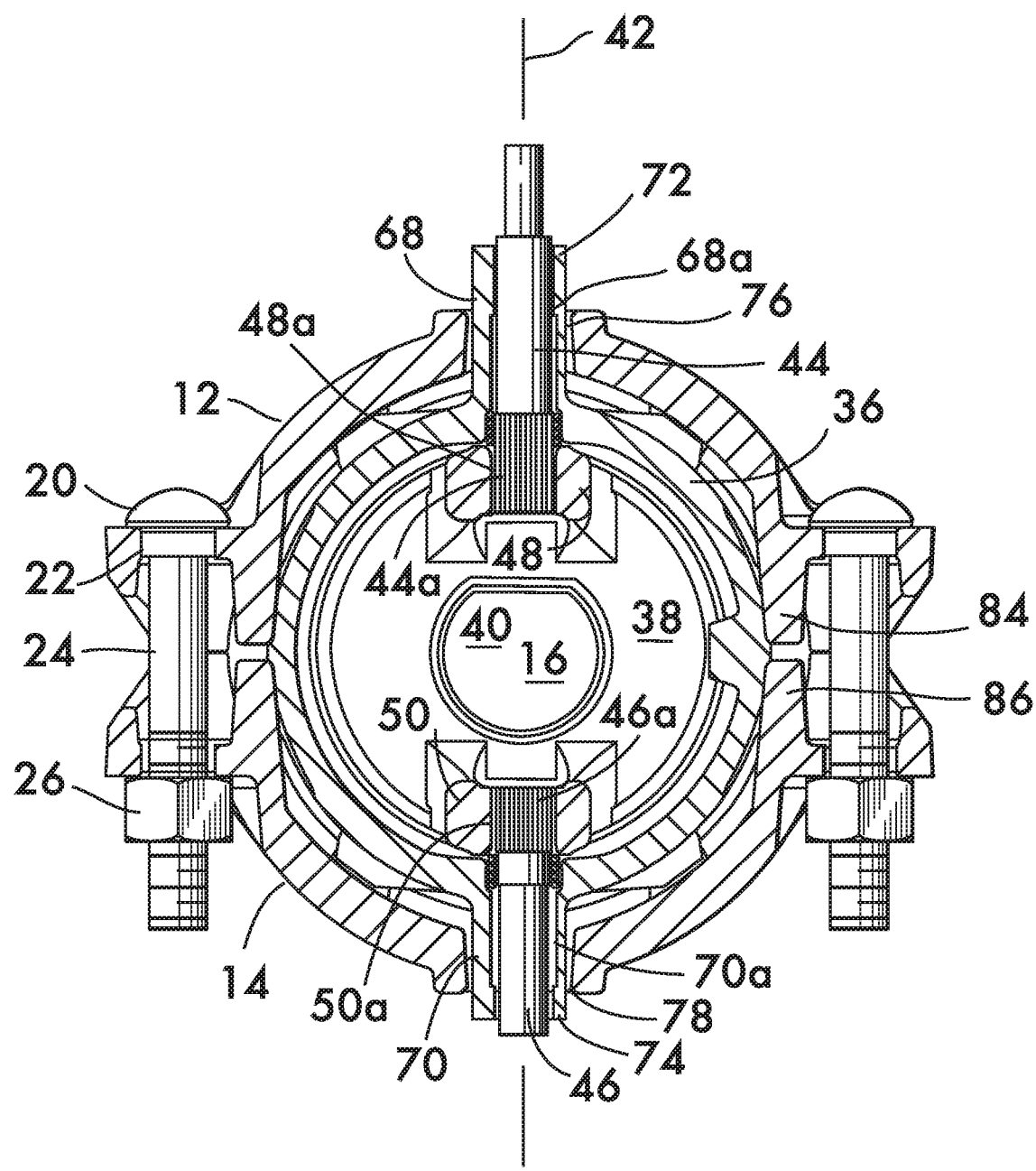
FIG. 4 is a cross sectional view of the valve coupling shown in FIG. 3.

Segments 12 and 14 may be supported in spaced apart relation by the seals 82, or, as shown in FIGS. 2 and 4, the segments may have respective projections 84 and 86 that engage the valve housing 36. The projections 84, 86 are designed to deform when force is applied by tightening the connection members 18 to permit the segments to be drawn toward one another and into engagement with the pipe elements during installation as shown in FIG. 4.

Figure 5:
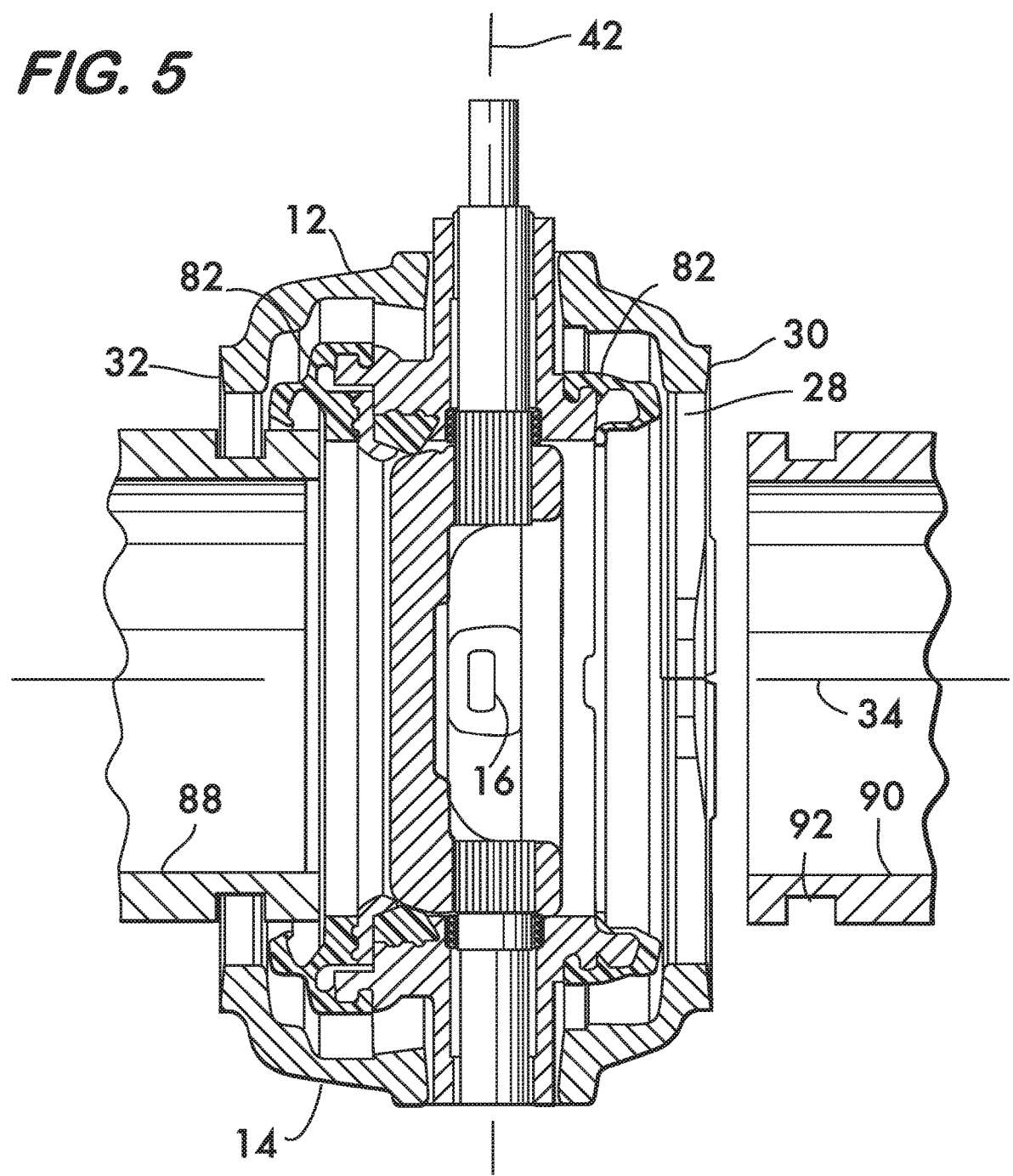
FIGS. 5 and 6 illustrate use of the valve coupling shown in FIG. 1 to connect pipe elements in end to end relation.
Figure 6:
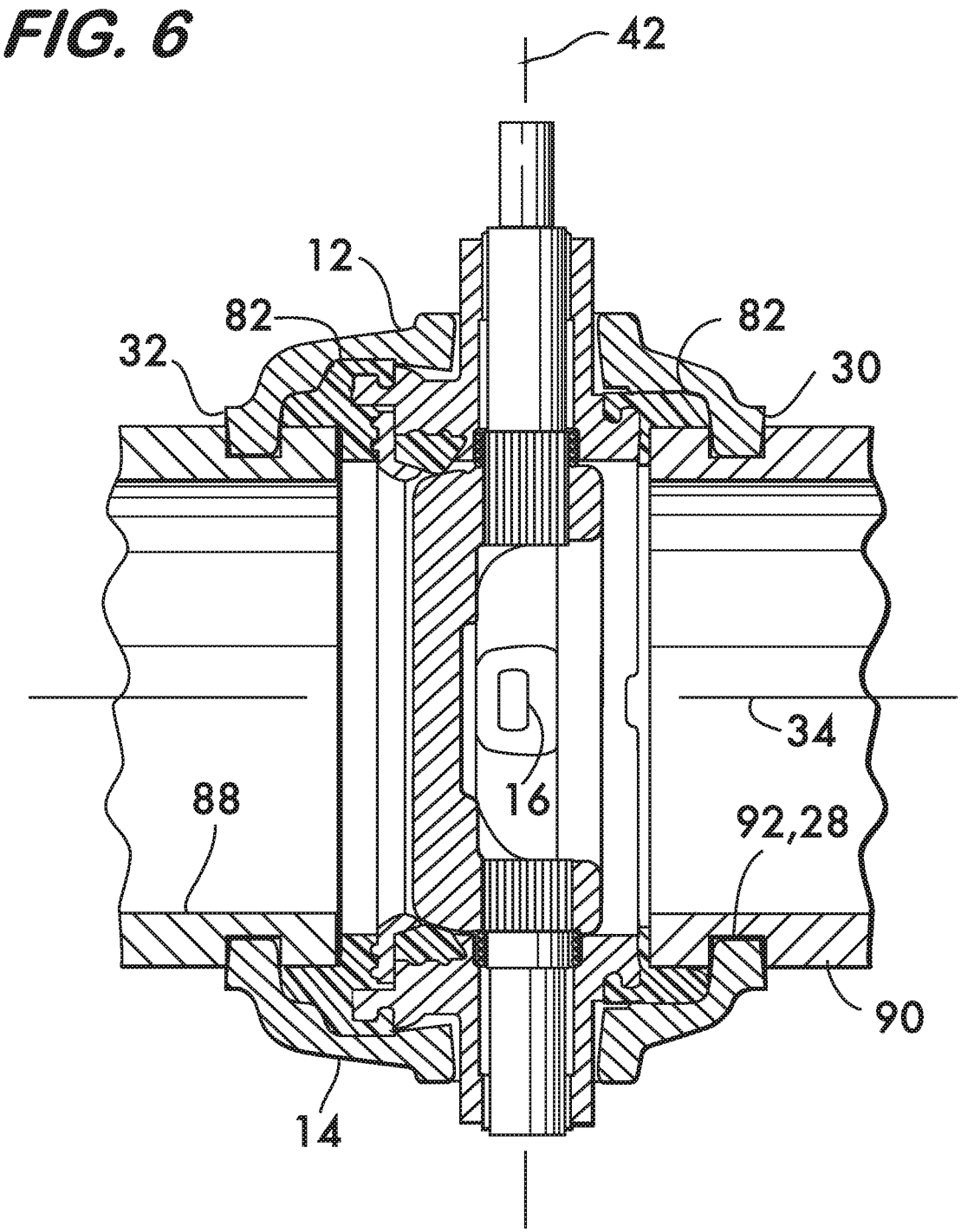
Figure 7:
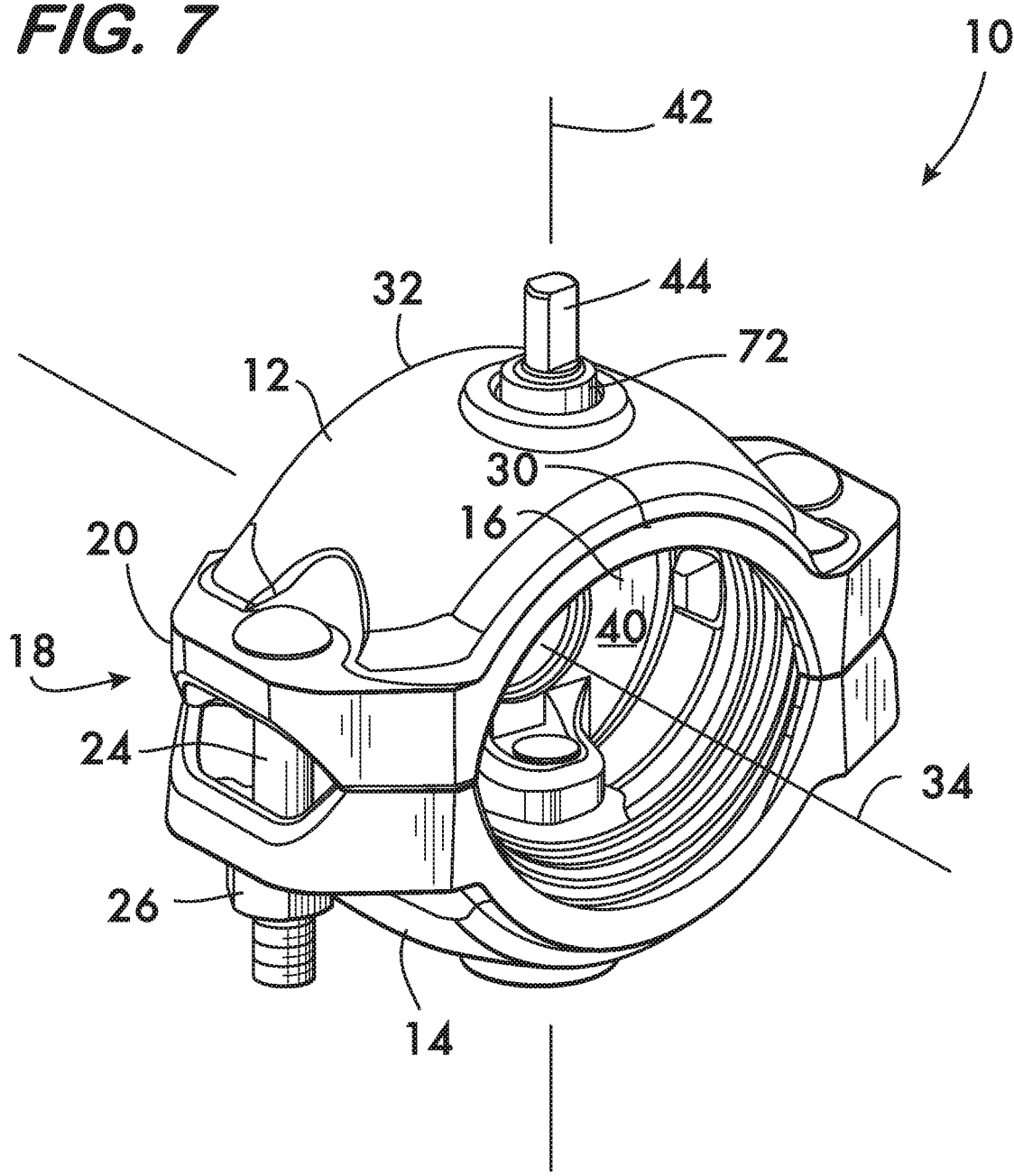
FIG. 7 is an isometric view of the valve coupling shown in FIG. 1 in the state as used to form a pipe joint.

In use, as shown in FIG. 5, a valve coupling 10 is provided in the pre-assembled state (see also FIG. 1) with segments 12 and 14 positioned in spaced apart relation. Pipe elements 88 and 90 are inserted into the central space 16 between the segments 12 and 14 and into engagement with seals 82. In this example, the pipe elements have circumferential grooves 92 that receive projecting arcuate surfaces 28 on opposite sides 30 and 32 of the segments. As shown in FIGS. 4 and 6, the attachment members are tightened (nuts 26 tightened on bolts 24 engaging lugs 20) to draw the segments 12 and 14 toward one another and into engagement with the pipe elements 88 and 90, the arcuate surfaces 28 engaging circumferential grooves 92 in the pipe elements. As the segments 12 and 14 are drawn toward one another the seals 82 are compressed between the segments, the valve housing 36 and the pipe elements 88 and 90 to form a fluid tight joint. FIGS. 4, 6 and 7 show the final configuration of the valve coupling 10 upon joint installation, the pipe elements not shown for clarity in FIG. 7. Note that in this example embodiment the connection members 18 (lugs 20 in this example) meet in what is known as "pad to pad" engagement when the valve coupling 10 is properly installed. This design is advantageous because it permits ready visual inspection confirming proper installation, and eliminates the need to tighten the bolts 24 to a specific torque value.

According to the prior art, assembly of a valve having a valve closing member proceeds substantially from the outside of the valve housing. The valve closing member is positioned within the valve housing and its lugs are aligned with openings in the valve housing. The stems upon which the valve closing member rotates are then inserted from the outside of the valve housing to support the valve closing member for rotational motion. This configuration of valve closing member and stems requires complex sealing arrangements and robust retention means to hold the valve stems in the valve against the internal pressure within the valve. The valve coupling 10 according to the invention substantially eliminates these design challenges to provide an improved valve coupling as described below.

Figure 8A:
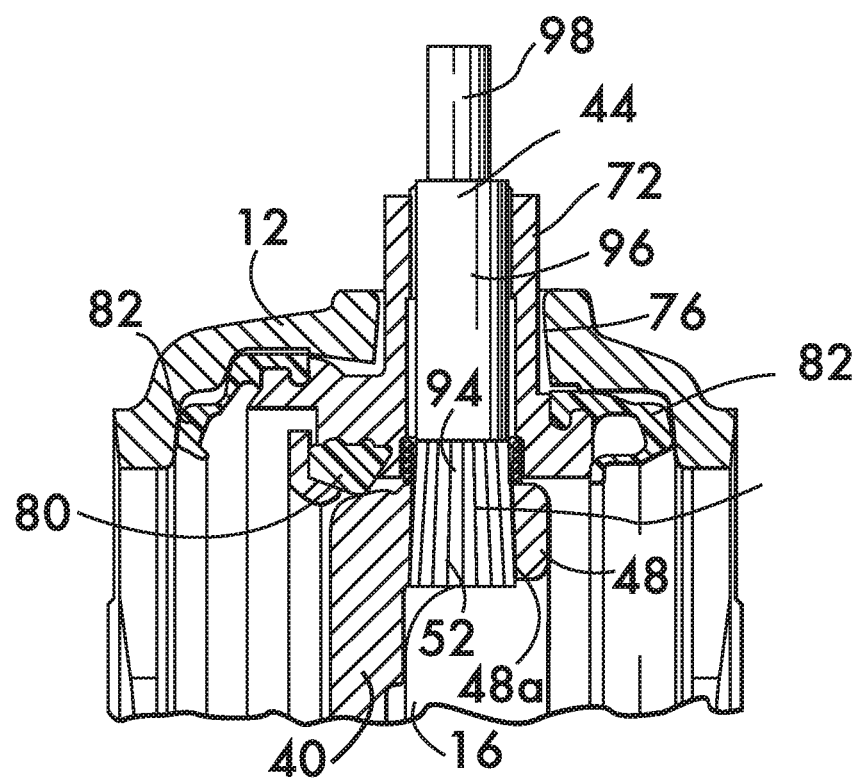
FIG. 8A is a longitudinal sectional view of a portion of the valve coupling on an enlarged scale.

The improved design begins with shafts 44 and 46, shown in detail in FIGS. 8 and 9. Shafts 44 and 46 are tapered, in this example in a step-wise manner with sections 94, 96 and 98 comprising shaft 44 and sections 100, 102 and 104 comprising shaft 46. Shafts 44 and 46 are tapered in a reverse manner from prior art stems in that the ends 44b, 46b of the shafts 44, 46 that extend outwardly from the valve housing 36 have the smaller diameter as compared with the ends 44a, 46a that respectively engage the lugs 48 and 50 of the valve closing member 40. Additionally, advantage may also be secured by tapering at least a portion of the shaft 44. An example of this embodiment is shown in FIG. 8A, wherein the section 94 (which may have the male spline 52) is tapered. The tapered section 94 engages a tapered aperture 48a in lug 48 and thus requires no additional features to retain the shaft 44 to the valve closing member 40. This shaft configuration also reduces rotational friction and is self-compensating for wear.

Figure 10:
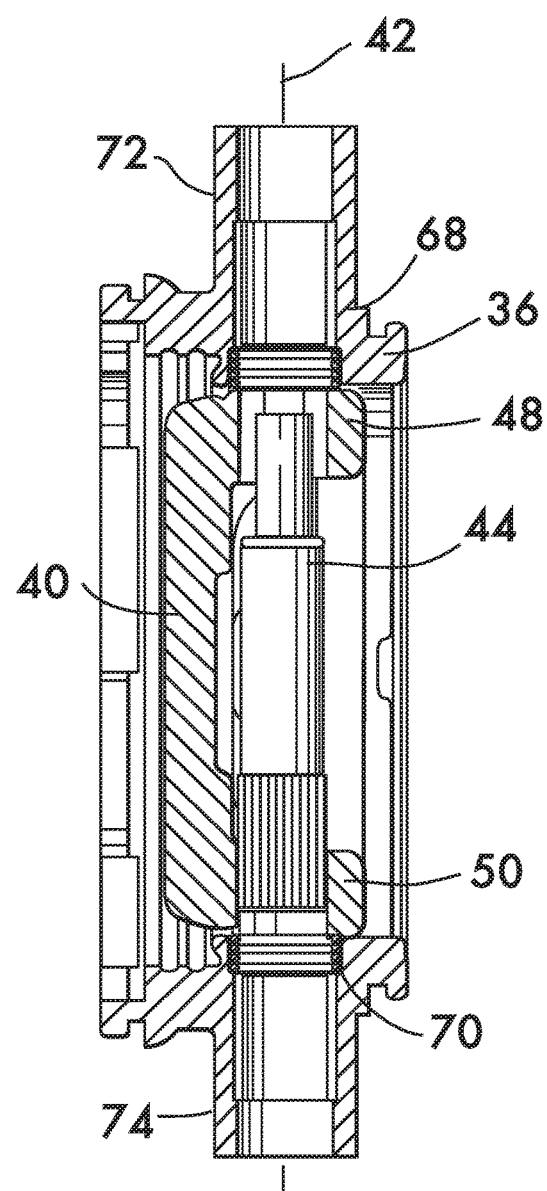
FIGS. 10-12 are longitudinal sectional views illustrating a method of assembly of a valve or a valve coupling.
Figure 11:
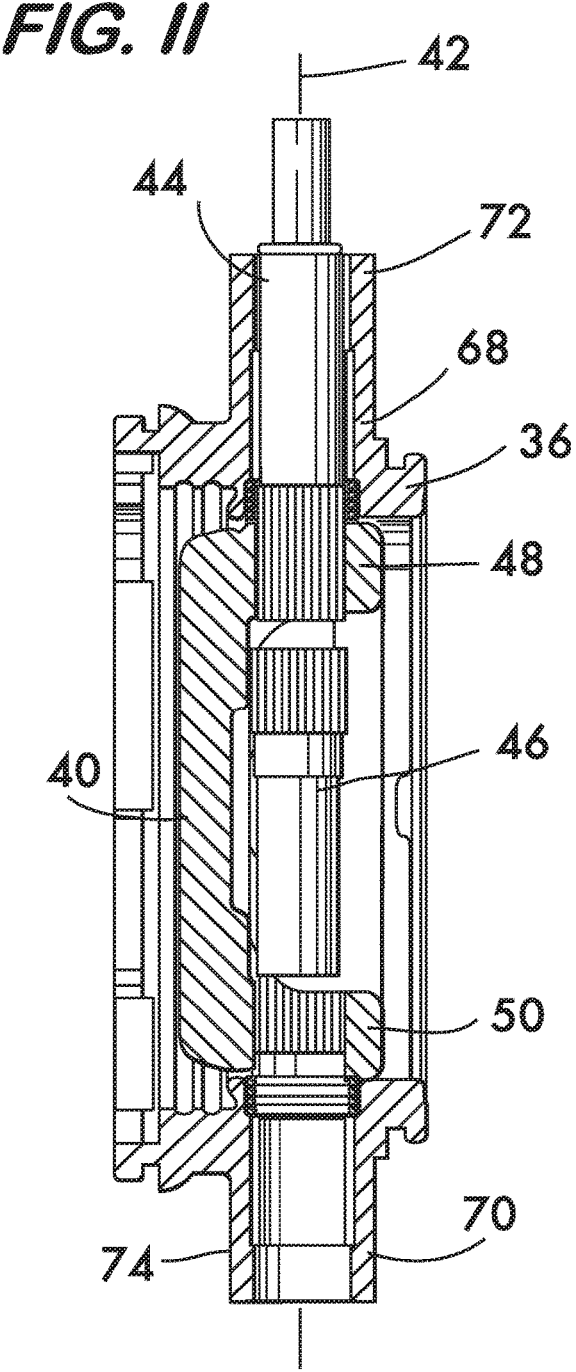
Figure 12:
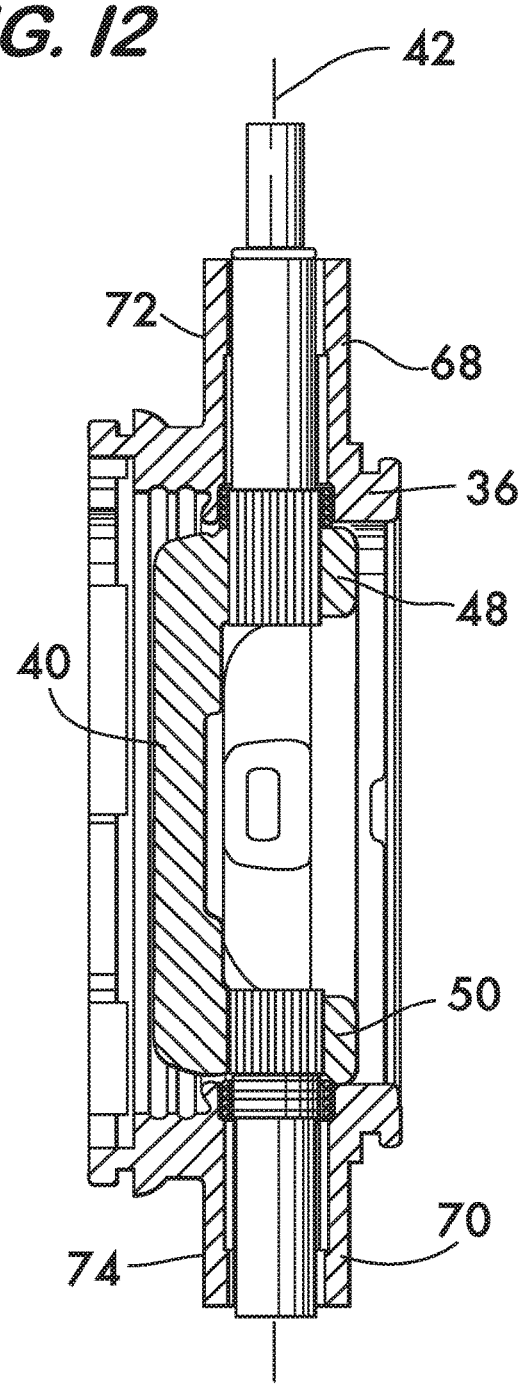

Inverting the taper of shafts 44 and 46 provides numerous advantages. For example, assembly of the valve is simplified. As shown in FIG. 10, shaft 44 is positioned between the lugs 48 and 50 of valve closing member 40. The valve closing member is then positioned within the valve housing 36 and the lugs 48 and 50 and shaft 44 are aligned with the bearings 68 and 70 (bonnets 72 and 74 in this example) in valve housing 36. As shown in FIG. 11, shaft 44 is then inserted through lug 48 and into the bonnet 72 from within the valve housing 36. FIG. 11A shows in detail the simplified bearing and seal arrangement wherein bearing elements 106 and O-ring type seals 108 engage shaft 44 to effect a seal between the shaft 44 and bonnet 72. A retainer ring 110 is used in cooperation with a circumferential groove 112 in shaft 44 to retain the shaft within the bonnet. The next assembly step, as shown in FIG. 11, is to position shaft 46 within the valve housing 36 and aligned with lug 50 of valve closing member 40. As shown in FIG. 12, the shaft 46 is inserted through lug 50 of valve closing member 40 and into bonnet 74. Shaft 46 may have a similar seal and bearing arrangement as shaft 44 shown in FIG. 11A. Once the valve closing member 40 and shafts 44 and 46 are assembled into valve housing 36 the valve housing is assembled within the coupling segments 12 and 14. This may be effected by first positioning the valve housing 36 within segment 14 such that it is supported on projections 86 with the bonnet 74 extending through opening 78 in segment 14 (see FIG. 2). Next segment 12 is positioned with projections 84 engaging the valve housing 36, the shaft 44 and bonnet 72 passing through opening 76 in segment 12. In this configuration the holes 22 in attachment lugs 20 of attachment members 18 will be aligned, and bolts 24 are inserted through the holes.

Nuts 26 are threaded and tightened onto bolts 24 to place the valve coupling in the pre-assembled state shown in FIGS. 1 and 2.

It is expected that valves and valve couplings according to the invention will provide both improved manufacturability and improved performance over the prior art.

What is claimed is:

1. A valve for controlling flow through pipe elements, said valve comprising:
    a valve housing surrounding and defining a bore;
    a valve closing member mounted within said bore, said valve closing member being rotatable about an axis of rotation between an open position permitting flow through said bore and a closed position preventing flow through said bore;
    first and second lugs mounted in spaced relation to one another on said valve closing member, said lugs defining respective apertures aligned with said axis of rotation;
    first and second shafts extending in opposite directions along said axis of rotation, said first shaft being received within said aperture of said first lug, said second shaft being received within said aperture of said second lug;
    first and second bearings mounted on said valve housing diametrically opposite to one another, said first and second bearings respectively defining first and second passages through said valve housing, said first and second passages being aligned with said axis of rotation, said first bearing receiving said first shaft, said second bearing receiving said second shaft; wherein
    each said shaft has a diameter at a first end larger than a diameter at a second end, said first end of first shaft engaging and being retained within said valve housing by said first lug, said first end of said second shaft engaging and being retained within said valve housing by said second lug.

2. The valve according to claim 1, wherein said first bearing comprises a first bonnet extending from said valve housing.

3. The valve according to claim 2, wherein said second bearing comprises a second bonnet extending from said valve housing.

4. The valve according to claim 1, wherein at least a portion of one of said shafts is tapered.

5. The valve according to claim 1, wherein at least one of said shafts is step-wise tapered from said first end to said second end.

6. The valve according to claim 1, further comprising a first seal positioned between said first bearing and said first shaft.

7. The valve according to claim 1, further comprising a second seal positioned between said second bearing and said second shaft.

8. The valve according to claim 1, wherein:
    a first end of at least one of said shafts comprises a male spline;
    at least one of said lugs comprises a female spline, said male spline engaging said female spline to secure said at least one shaft to said at least one lug.

9. The valve according to claim 8, wherein said first end of said at least one shaft is tapered.

10. The valve according to claim 1, further comprising a plurality of segments attached to one another end to end surrounding said housing and forming a coupling for joining said pipe elements, each said segment having attachment members located at opposite ends, each said segment having arcuate surfaces positioned on opposite sides thereof for engagement with said pipe elements.

11. The valve according to claim 10, wherein said attachment members comprise attachment lugs extending outwardly from opposite ends of each said segment, each said attachment lug defining a hole for receiving a fastener.

12. The valve according to claim 10, wherein said arcuate surfaces project from said segments radially toward an axis aligned coaxially with said bore.

13. The valve according to claim 10, wherein said plurality of segments comprises no more than two said segments.

14. The valve according to claim 10, wherein at least one of said bonnets extends through an opening in one of said segments.

15. The valve according to claim 1, wherein said valve closing member comprises a disk.

16. A valve coupling for joining pipe elements and controlling flow therethrough, said valve coupling comprising:
    a plurality of segments attached to one another end to end surrounding a central space;
    a valve housing captured between said segments and surrounding and defining a bore;
    a valve closing member mounted within said bore, said valve closing member being rotatable about an axis of rotation between an open position permitting flow through said bore and a closed position preventing flow through said bore;
    first and second lugs mounted in spaced relation to one another on said valve closing member, said lugs defining apertures aligned with said axis of rotation;
    first and second shafts extending in opposite directions along said axis of rotation, said first shaft being received within said aperture of said first lug, said second shaft being received within said aperture of said second lug;
    first and second bearings mounted on said valve housing diametrically opposite to one another, said first and second bearings respectively defining first and second passages through said valve housing, said first and second passages being aligned with said axis of rotation, said first bearing receiving said first shaft, said second bearing receiving said second shaft; wherein
    each said shaft has a diameter at a first end larger than a diameter at a second end, said first end of said first shaft engaging and being retained within said valve housing by said first lug, said first end of said second shaft engaging and being retained within said valve housing by said second lug.

17. The valve coupling according to claim 16, wherein said first bearing comprises a first bonnet extending from said valve housing.

18. The valve coupling according to claim 17, wherein said second bearing comprises a second bonnet extending from said valve housing.

19. The valve coupling according to claim 18, wherein at least one of said bonnets extends through an opening in one of said segments.

20. The valve coupling according to claim 16, wherein at least a portion of at least one of said shafts is tapered.

21. The valve coupling according to claim 16, wherein at least one of said shafts is step-wise tapered from said first end to said second end.

22. The valve coupling according to claim 16, further comprising a first seal positioned between said first bearing and said first shaft.

23. The valve coupling according to claim 16, further comprising a second seal positioned between said second bearing and said second shaft.

24. The valve coupling according to claim 16, wherein:
a first end of at least one of said shafts comprises a male spline;
at least one of said lugs comprises a female spline, said male spline engaging said female spline to secure said at least one shaft to said at least one lug.

25. The valve according to claim 24, wherein said first end of said at least one shaft is tapered.

26. The valve coupling according to claim 16, further comprising:
attachment members located at opposite ends of each said segment;
arcuate surfaces positioned on opposite sides of each said segment for engagement with said pipe elements.

27. The valve coupling according to claim 26, wherein said attachment members comprise attachment lugs extending outwardly from opposite ends of each said segment, each said attachment lug defining a hole for receiving a fastener.

28. The valve coupling according to claim 26, wherein said arcuate surfaces project from said segments radially toward an axis aligned coaxially with said bore.

29. The valve coupling according to claim 16, wherein said plurality of segments comprises no more than two said segments.

30. The valve according to claim 16, wherein said valve closing member comprises a disk.

31. A method of assembling a valve having a housing defining a bore in which a valve closing member is rotatably mounted on first and second shafts, said method comprising:
positioning said valve closing member within said bore so as to align first and second lugs mounted on said valve closing member with respective first and second bearings in said housing;
positioning said first shaft between said lugs;
inserting said first shaft through said first lug and into said first bearing;
retaining said first shaft within said housing using said first lug;
positioning said second shaft between said lugs;
inserting said second shaft though said second lug and into said second bearing; and
retaining said second shaft within said housing using said second lug.

32. The method according to claim 31, further comprising:
positioning said housing within a first segment of a coupling;
attaching a second segment to said first segment so as to surround said housing.

* * * * *